Oct. 16, 1951   M. BEYERS ET AL   2,571,409
METAL DEFECT TESTING METHOD
Filed Oct. 13, 1944   2 Sheets-Sheet 1
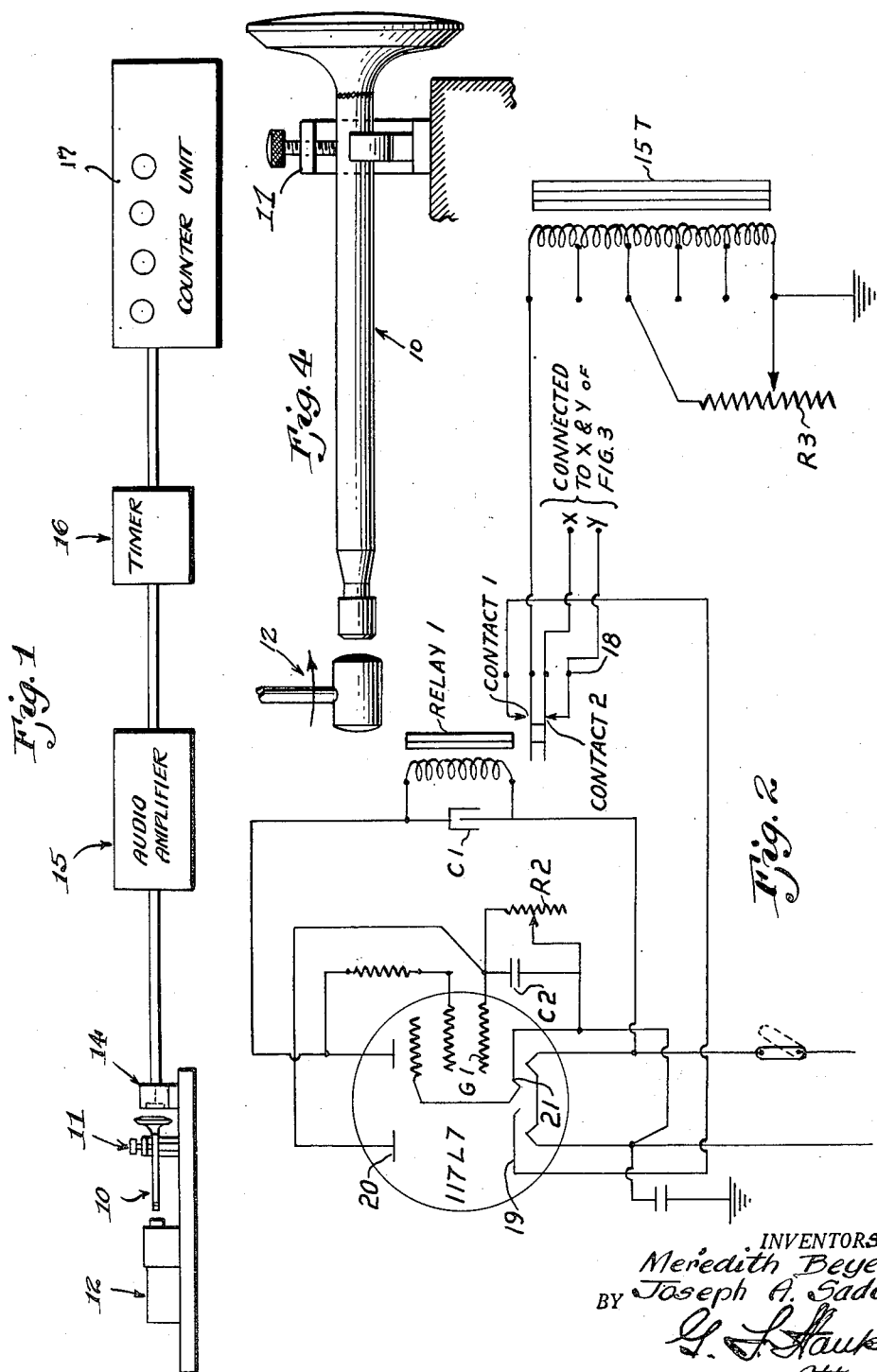
INVENTORS
Meredith Beyers
Joseph A. Sadony
BY
G. L. Hauke,
Attorney

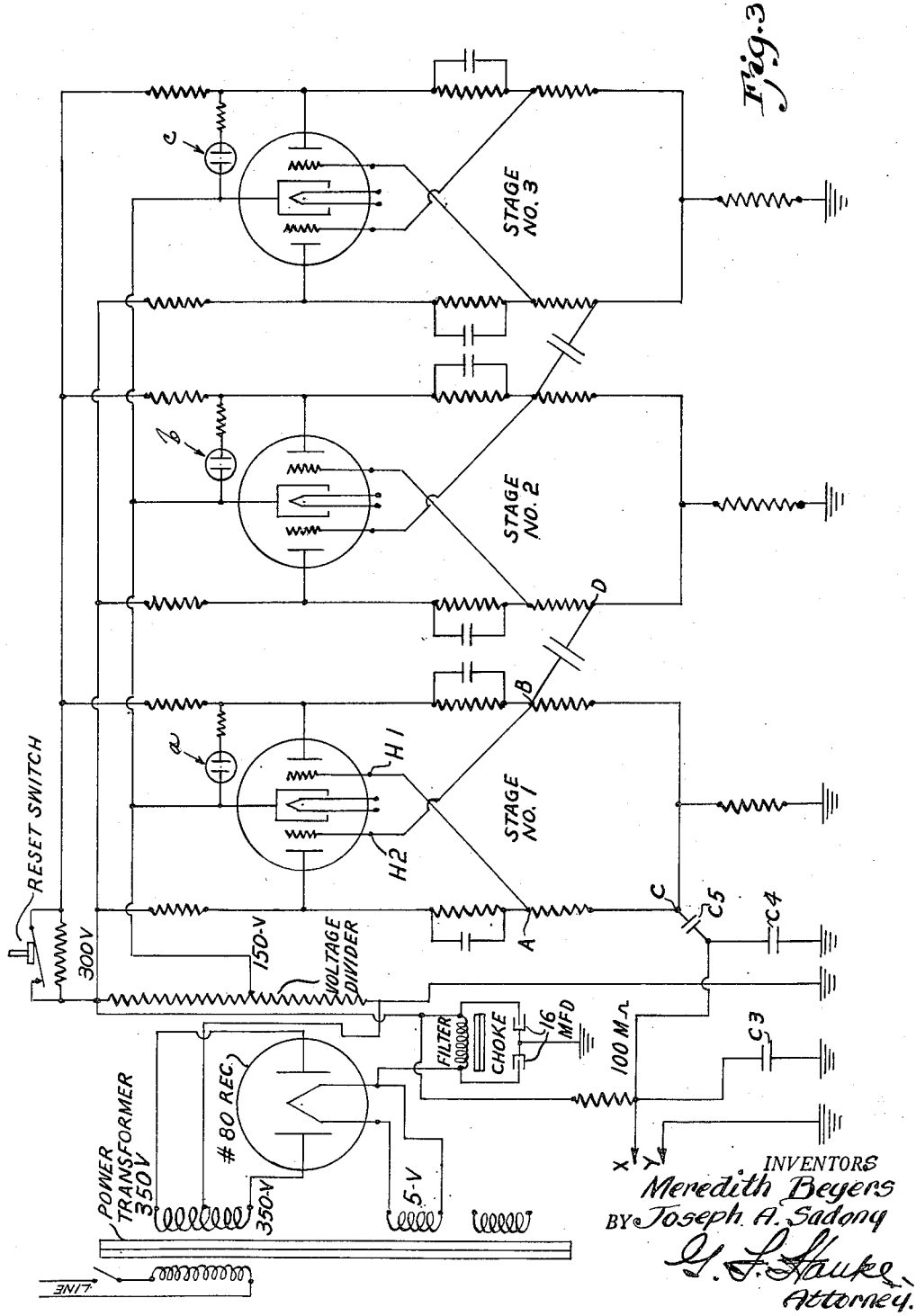

Patented Oct. 16, 1951

2,571,409

UNITED STATES PATENT OFFICE 2,571,409

METAL DEFECT TESTING METHOD

Meredith Beyers and Joseph A. Sadony, Montague, Mich., assignors to Continental Motors Corporation, Muskegon, Mich., a corporation of Virginia Application October 13, 1944, Serial No. 558,596

2 Claims. (Cl. 73—69)

Our invention relates to a metal defect testing method, and is more particularly applicable for detecting internal defects in metal pieces not readily revealed by the customary tests to which said pieces are usually subjected.

It is an object of our invention to provide a method for detecting these internal defects in engine valves or other parts and materials, by using an apparatus employing certain principles and modes of sonic analysis, and particularly by selecting certain vibrations and measuring the duration of the vibration, since the degree of soundness of the valve or other part is proportional to the duration of the preselected vibration, the longer the duration, the sounder the part which is under test.

For a more detailed understanding of our invention reference may be had to the accompanying drawings which diagrammatically illustrate the principles of our invention, and in which:

Fig. 1 is a diagrammatic view of the apparatus for testing valves or other parts, Fig. 2 is a diagrammatic illustration of an electronic timer, Fig. 3 is a diagrammatic view of an electronic counter, and Fig. 4 is an elevational view of a valve.

Although the principles of the present invention were embodied in an apparatus particularly for testing engine valves or the like for internal defects, it will, of course, be obvious that these principles are in general applicable for testing many other parts and materials. The invention comprises the application of certain principles and modes of sonic analysis which are effective in detecting internal defects not revealed by other means customarily employed for such tests.

The present application of our invention is employed for testing an article such as an engine valve, where the material and structure permit the transmission, internal reflection and consequent duration of vibrations caused by impact. Fig. 1 illustrates a valve 10 being subjected to test for detecting an internal defect. The valve 10 is preferably clamped in a holder 11, which is constructed and arranged to hold said valve at a predetermined point and in such a manner that when an impact of the proper quality is delivered to the valve at the proper point on the surface thereof, in predetermined relation to the point of holding, the passage of preselected vibrations and their internal reflections is permitted with a minimum of interference on the part of vibrations that are dampened by the holder. While the low frequency vibrations can be dampened to a certain degree by clamping the work piece any place along the length of the piece, it has been found that by clamping the valve shown near the weld, best results are attained. Other shapes will necessitate predetermining where is the best place to clamp the work piece to obtain the maximum dampening effect. A solenoid operated hammer 12 is actuated in the present application to strike the end of the valve stem. On striking the valve or other part to be tested, various low and high pitched vibrations are generated, the high pitched internal vibrations, in the present instance, being the ones to measure since the character and duration of these vibrations are indicative of the soundness of the valve. The vibrations thus preselected are those of which the duration depends directly upon the soundness of the piece in the path of the vibrations. The holder dampens out the low pitched vibrations in the present instance. These vibrations, which are thus to be measured, are then picked up by means of a microphone 14, which is constructed of such a range and sensitivity as to be suitable to the external sonic vibrations that are to be measured and analyzed. The damping of the other vibrations decreases their interference with the preselected vibrations that are to be measure and analyzed.

The vibrations being measured are then amplified and further selectively tuned in by means of a radio or other type of amplifier 15, which contains adjustable filters and/or tuning devices capable of sonic selection. The selected tone or tones are then subjected to analysis by any or all of the following means:

(1) Loud speaker
(2) Decibel or other type of meter
(3) Oscillograph or any other type of transient or recording electrical or electronic means of vibration or sonic analysis.

Since the relative duration of the selected vibration is proportional to the soundness of the valve or other piece being tested, there is preferably incorporated with the amplifier, as an auxiliary to, or substitute for the above mentioned means of sonic analysis, a device 16, such as a timer relay and negative impulse counter which records by means of signal lights or other suitable transient or recording device the degree of soundness of the piece in terms of the duration of the preselected vibration, which is dependent for its normal duration upon the soundness of the piece. This may be evaluated in terms of any arbitrary timing or power unit upon any desired or arbitrary scale for which an average value of a number of sound pieces provides a standard.

Any suitable type of timing relay may be employed or constructed for the above mentioned purpose. Fig. 2 illustrates an electronic timer 16 suitable for our purpose, and this timer may be employed in conjunction with any suitable type of mechanical, electrical, or electronic counter and any suitable mode of indicating or permanently recording the result. Fig. 3 illustrates an electronic counter 17 which may suitably be embodied in our apparatus.

We have assumed a scale of five (5), for example, in testing valves, particularly welded valves, for internal cracks or other defects, an indicated reading of five showed a sound valve. On a scale of 5, for example, in testing welded valves (see Fig. 4), it was found advisable to accept valves of soundness value 3, 4 and 5. The value of 1 is indicated on the negative impulse counter 17 shown in Fig. 3 by the lighting of a first signal light "a." A value of 2 was indicated by the first light "a" going off and the second light "b" coming on. A value of 3 was indicated by the lights "a" and "b" remaining lit. A value of 4 was indicated by the first two lights "a" and "b" going off and the third light "c" coming on. A value of 5 was indicated by the third light "c" remaining lit and the first light "a" coming on again.

In Fig. 1 of the drawing is shown a blocked diagram of the channels and units through which a test is made and recorded. Element 14, in Fig. 1, is a high frequency responding crystal microphone. The sound generated by the valve that has been struck by the hammer 12 is carried into the high gain input of an electronic audio amplifier 15. This amplifier is a standard unit incorporating a low frequency filtering network that most good amplifiers have in order to filter out low audio signals. Since we are only interested in the extremely high audio frequency bell tones produced by the excited valve and not in the low frequency tones, we filter out all the low tones by adjusting the tone controls of the amplifier, thus allowing only the extremely high frequency vibrations to pass through to the electronic timer 16, in Fig. 1.

In Fig. 2 we show the output transformer 15T of the high gain amplifier. The section of the transformer shown is the multi-tapped secondary winding. In order to properly load the output tubes of the amplifier, we insert a variable resister R3, across the 16 ohm tap and adjust R3, which is a non-inductive resister, at 16 ohms. One end of the secondary is grounded with the frame of the unit.

The five hundred ohm line tap is taken directly to contacts 1 of the electronic timer 16. This line is fastened to contacts on relay 1, which contacts are normally closed when the 117L7 electron tube is on. The audio frequency signal then passes to cathode 19 of the 117L7 electron tube, where it is rectified and taken off plate 20 as D. C.

It will be noticed that while the electron tube is in operation with no incoming signal, grid G1 is held at zero bias by R2, thus energizing relay 1, closing contact 1. When relay 1 is energized, the incoming signal is allowed to pass through contact 1, to cathode 19, where it is rectified.

Referring to Fig. 2, after the incoming signal is rectified, it passes from plate 20 to condenser C2, which is tied across from grid G1 to cathode 21. R2 is also connected across C2 which is a variable resister acting as a bleeder across C2. Grid G1 is held at zero bias by R2 until the rectified incoming signal charges C2, until the negative charge on G1 reaches cut-off bias, thus deenergizing relay 1 and opening contact 1, preventing any further incoming signal from reaching cathode 19.

R2 discharges C2 at any preselected rate of speed determined by the setting of R2. When C2 potential reaches zero bias again, the tube again energizes relay 1, closes contact 1, allowing C2 to again reach maximum cut-off potential, which in turn opens contact 1.

Each time relay 1 is operated, contacts 2 on relay 1 open and close, thus shorting out C3 and C4. See Fig. 3. Each time condensers C3 and C4 are shorted out and then opened by the action of contact 2 on relay 1, an electrical surge goes back into the condensers, sending a negative impulse into the first stage of the electronic counter through C5 (Fig. 3).

It will be noted in the electronic counter, that each stage is comprised of a twin triode, such as 6SN7, 6N7, 6J6, etc. Any of these tubes works very well. Around these tubes is a network of condensers and resisters comprising two legs of a resistance network, one for each triode section of a tube.

Note first that a fixed potential of plus 150 volts (with respect to B minus and ground) is applied to the cathode of the tube at all times, by the power pack. Grid and plate potential are obtained from the resistance network included in the counter circuit (Fig. 3), and depend upon relative currents through the two branches of the resistance network for each electron tube.

Assume that the grid of the right hand triode in the tube of stage 1 is essentially at cathode potentials (zero bias), Fig. 3, and assume that no signal impulses have yet arrived. At zero bias, the right hand triode will conduct saturation plate current, and its plate to cathode voltage drop will be lower but actually it is 20 v. lower than the extinction voltage of the neon lamp $a$ connected across this section. For this assumed initial condition, then, the neon lamp in this stage is extinguished.

The grid bias voltage should be examined next, since it controls the switch over from one triode section to the other in stage No. 1. These bias voltages are obtained from points A and B on the two branches of the resistance network.

Redrawing the circuit so that the left side of the triode is conducting the potential changes in the conducting resistance network leg will show decided drop, due to the conducting triode, thus causing H1 to be at −25 v. bias rendering the right side of the triode non-conductive, thus increasing the plate cathode voltage from 20 v. to plus 150 v. above ground, subsequently, lighting neon tube $a$. Returning to the original condition where the right hand side of the triode section is conducting, this condition is stable as long as no negative impulse is received at point C. When a negative impulse is received at point C, it tends to drive H1 minus bias, which in turn will cut off the right hand side of the triode, thus causing a potential rise at point B driving H2 to zero bias, thus allowing the left hand side of the triode to start conducting, which holds all potentials stable and increases the potentials across the neon light, causing it to glow.

All of the above happens when one negative impulse is sent into the first stage, and the impulse that went out at point B was positive so it would not have any effect on the stability of stage No. 2.

When the second negative impulse arrives at point C, stage No. 1 reverses to its original network potentials extinguishing the neon light in stage No. 1; at the same time the decided voltage drop in the right hand leg in the network, resulting in a negative impulse going out to point D, in stage No. 2, changes the right hand conducting triode to non-conducting and the left hand triode to conducting, thus turning on neon light b.

This follows through each subsequent stage and turns the neon lights on and off in a pattern, as follows:

All neon lights are normally out at the beginning, due to a reset switch which causes a voltage drop in all right hand legs of each stage. The first impulse entering at point C lights neon a. The second impulse entering at point C extinguishes a and lights neon b. The third impulse leaves neon b burning and turns on neon a. The fourth impulse extinguishes both a and b neons and lights neon c. The fifth impulse leaves c burning and lights a. The sixth impulse leaves c burning, extinguishes a and lights b. The seventh impulse leaves b and c burning and lights a. The eighth impulse extinguishes all lights and each stage is normal.

This counter circuit is essentially shown and described in an article "A Four-Tube Counter Decade," by John T. Potter in the June 1944 issue of Electronics, page 110. See especially the circuit shown on page 112.

The foregoing method of visibly indicating the soundness of the valve by means of the above sequence of lights is merely illustrative of a suitable method of timing, evaluating and indicating the comparative duration of the preselected vibration, and will obviously suffice for the purpose of evaluating the soundness of an object, such as a valve or other part, by this method.

It is apparent that this method may obviously be manually carried out to some degree of accuracy providing the valve is gripped by hand at a point where such will dampen the low pitched vibration and appreciably prevent same from interfering with the high pitched vibrations which are to be evaluated. The valve is struck on the end of the valve stem to generate the required vibrations. Most defects occur at the weld in the case of a welded valve, but the present invention serves to detect a defect any place. Thus, if the valve or other part which is to be tested proves by the above test to have a soundness value of 1 or 2, we know it is defective somewhere, and on microscopic examination, we have usually found an internal crack in the valve. This discovery has proved to be very important in testing valves and other machine parts for internal defects.

Although we have illustrated but one form of our invention and have described in detail but a single application thereof, it will be apparent to those skilled in the art to which our invention pertains, that various modifications and changes may be made therein without departing from the spirit of our invention or from the scope of the appended claims.

We claim:

1. A method of testing an elongated rod or bar of metal having a weld in a plane normal to its axis by detecting minute internal defects in said rod or bar which permits the transmission and internal reflection of vibrations caused by impact, and which comprises striking of the end of said rod or bar by impact to set up longitudinally travelling vibrations of different frequencies reflected internally thereof, clamping of said rod or bar in a fixture or vise at a point closely adjacent to said weld to substantially dampen the vibrations of low frequency transmitted at and near the external surface of such rod or bar and thereby permit the transmission and internal reflection of the vibrations of relatively high frequencies substantially longitudinally of the rod or bar along the central axis thereof, and measuring of the duration of said undampened vibrations of high frequencies aforesaid to determine the comparative soundness of the rod or bar which is being tested.

2. A method of testing an elongated rod or bar of metal having a weld in a plane normal to its axis by detecting minute internal defects in said rod or bar which permits the transmission and internal reflection of vibrations caused by impact, and which comprises striking of the end of said rod or bar by impact to set up longitudinally travelling vibrations of different frequencies reflected internally thereof, clamping of said rod or bar in a fixture or vice at a point closely adjacent to said weld to substantially dampen the vibrations of low frequency transmitted at and near the external surface of such rod or bar and thereby permit the transmission and internal reflection of the vibrations of relatively high frequencies substantially longitudinally of the rod or bar along the central axis thereof, and measuring of the duration of said undampened vibrations of high frequencies aforesaid to detemine the comparative soundness of the rod or bar which is being tested, by locating a microphone closely adjacent to one end of said rod or bar and in substantial alignment with axis thereof, and indicating of the duration of the vibrations of relatively high frequencies by tuning in same by means of an amplifier and a visual indicating device electrically connected in circuit with said microphone.

MEREDITH BEYERS.
JOSEPH A. SADONY.

REFERENCES CITED

The following references are of record in the file of this patent:

UNITED STATES PATENTS

| Number | Name | Date |
|---|---|---|
| 188,637 | Hopkins | Mar. 20, 1877 |
| 445,860 | De Place | Feb. 3, 1891 |
| 1,130,657 | Armstrong | Mar. 2, 1915 |
| 1,869,067 | Malmquist | July 26, 1932 |
| 1,871,886 | Inglis et al. | Aug. 16, 1932 |
| 2,078,792 | Fitz Gerald | Apr. 27, 1937 |
| 2,112,621 | Henszey et al. | Mar. 29, 1938 |
| 2,147,918 | Overback | Feb. 21, 1939 |
| 2,164,125 | Sokoloff | June 27, 1939 |
| 2,179,101 | Read, Jr., | Nov. 7, 1939 |
| 2,280,226 | Firestone | Apr. 21, 1942 |
| 2,320,390 | Shmurak | June 1, 1943 |
| 2,340,714 | Traver et al. | Feb. 1, 1944 |
| 2,345,679 | Linse | Apr. 4, 1944 |
| 2,352,880 | Andalikiewicz et al. | July 4, 1944 |

FOREIGN PATENTS

| Number | Country | Date |
|---|---|---|
| 336,766 | Great Britain | Oct. 23, 1930 |